United States Patent [19]
Booher

[11] Patent Number: 5,354,165
[45] Date of Patent: Oct. 11, 1994

[54] FRAMELESS CONTAINER TRANSPORT DUMP TRAILER

[76] Inventor: Howard Booher, 1871 State Rte. 44, Randolph, Ohio 44265

[21] Appl. No.: 76,201

[22] Filed: Jun. 11, 1993

[51] Int. Cl.$^5$ .............................................. B60P 1/04
[52] U.S. Cl. ........................... 414/498; 298/20 A; 298/22 AE; 414/485; 414/519; 105/261.2
[58] Field of Search ............... 298/17 R, 17 AR, 178, 298/198, 20 A, 22 R, 22 AE, 7, 22 C, 22 J, 22 P, 22 D, 23 R, 1 R; 414/469, 473, 482, 485, 498, 499, 500, 519; 105/261.1, 261.2, 270, 271, 274

[56] References Cited

U.S. PATENT DOCUMENTS

| | | | |
|---|---|---|---|
| 2,769,661 | 11/1956 | Schonrock | 298/20 A |
| 2,815,980 | 12/1957 | Harbers et al. | |
| 2,861,837 | 11/1958 | Morse | 298/20 A |
| 3,123,017 | 3/1964 | Konig et al. | 414/489 X |
| 4,111,485 | 9/1978 | Martin et al. | 298/22 R X |
| 4,954,039 | 9/1990 | Johnston et al. | |
| 5,007,791 | 4/1991 | Boughton | |
| 5,080,548 | 1/1992 | Bratlie et al. | 298/7 X |

FOREIGN PATENT DOCUMENTS 2834445  2/1980  Fed. Rep. of Germany ... 298/20 A

Primary Examiner—Frank E. Werner
Attorney, Agent, or Firm—Harpman & Harpman

[57] ABSTRACT

A dump trailer for the transportation of containers including a frameless trailer frame to receive and hold a rail transportable container for overland transport. A support system engageable on a fifth wheel of a tractor having a telescopically extensible hoist assembly and interconnected draft arms contains support and locking flanges to secure the container to the trailer and a pair of container contents transport guides extending over the trailer's frame to its free end during dumping.

7 Claims, 3 Drawing Sheets

FRAMELESS CONTAINER TRANSPORT DUMP TRAILER

BACKGROUND OF THE INVENTION

1. Technical Field

This invention relates to over the road transport trailers that are used to transport ISO type containers from a rail head to a dump site.

2. Description of Prior Art

Prior art devices of this type have heretofore been directed to so called roll off dumpsters in which a flat bed trailer receives a bulk container, and unloads the contents by elevation of the bed and roll off of the container. Other design configurations move the container to the end of the trailer then elevate same dumping the contents without removing the container from the trailer bed, see for example U.S. Pat. Nos. 2,815,980, 4,954,039 and 5,007,791.

In U.S. Pat. No. 2,815,980 a dump trailer is disclosed wherein the dump body is mounted on a frame for rolling movement longitudinally so that when the frame is elevated the dump body will be positioned i.e. moved rearwardly for ease of dumping off the end of the frame.

U.S. Pat. No. 4,954,039 is directed towards a uniframe roll off dumpster in which a container is movably positioned on a dump frame so that upon elevation of the frame the container will roll off same thus unloading the container from the trailer.

U.S. Pat. No. 5,007,791 refers to an ISO container handling system wherein a two-part trailer frame is used to engage, elevate and roll off the ISO container. The two-part frame consist of a wheel support structure and a separate pivotable container engagement frame.

SUMMARY OF THE INVENTION

A frameless ISO box transport trailer for the transportation and dumping of ISO containers without moving or unloading the ISO container from the transport trailer. A frameless trailer configuration locks the ISO container in preferred load weight distribution position forward of the trailer's real wheel assemblies. Container content guides adjacent the container allow for container contents dumping across a portion of the trailer without interfering with the wheel assemblies or requiring the need to remove the container from the trailer or move the container on the trailer to its end.

DESCRIPTION OF THE PREFERRED EMBODIMENT

Figure 1:
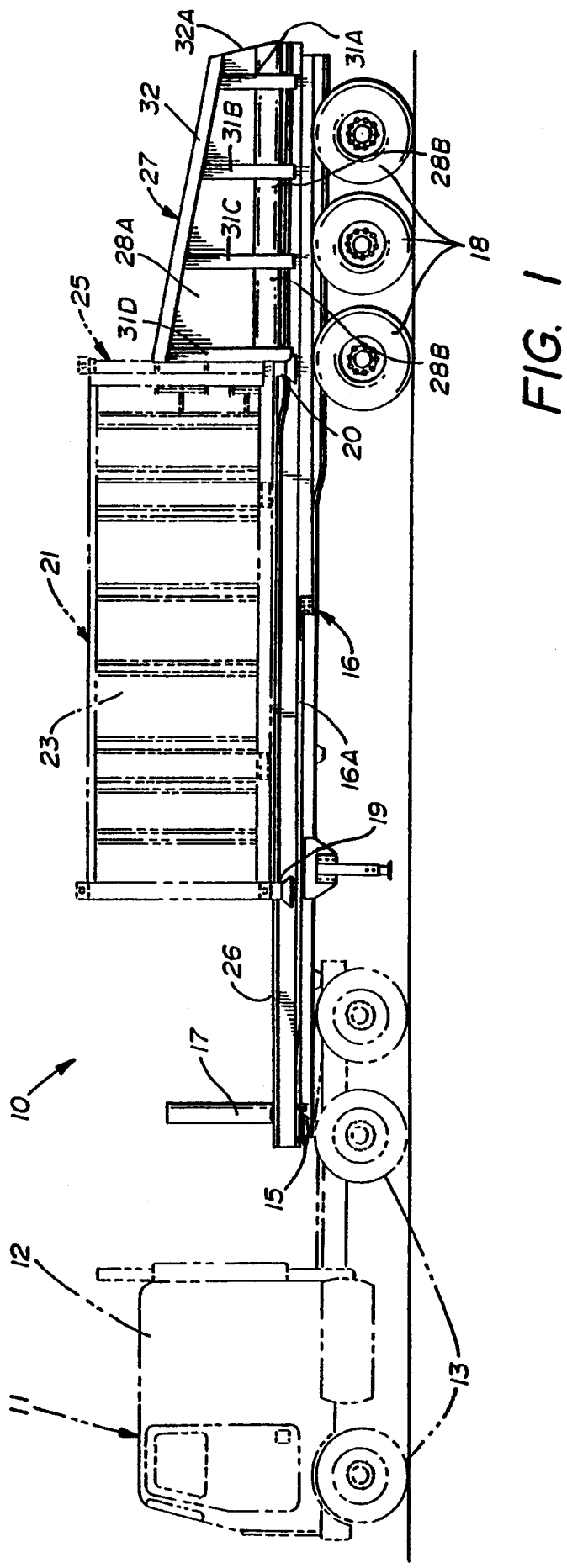
FIG. 1 is a side plan view of the trailer of the invention with an ISO container positioned thereof.
Figure 2:
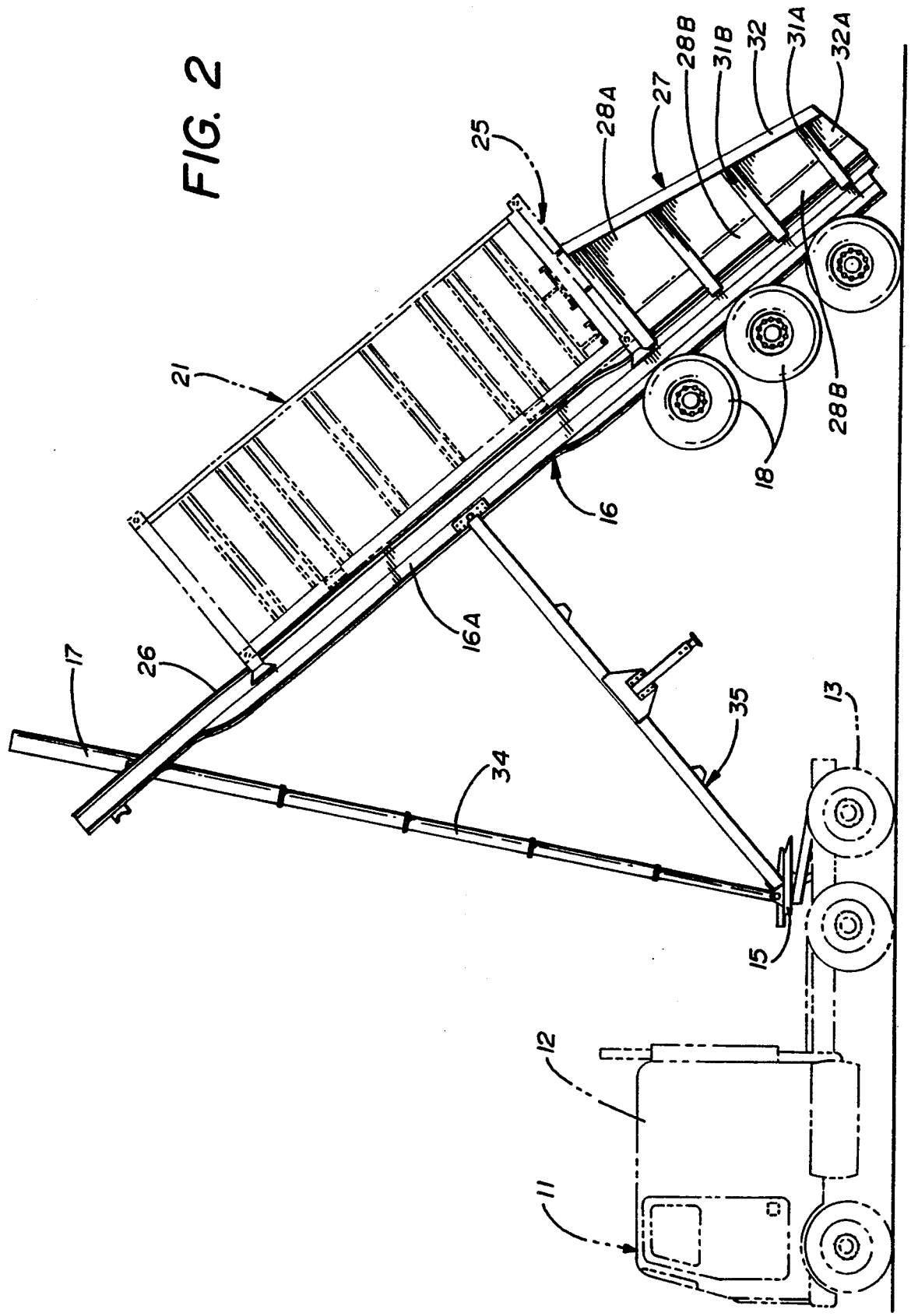
FIG. 2 is a side plan view of the trailer of FIG. 1 shown in an elevated discharge position.
Figure 3:
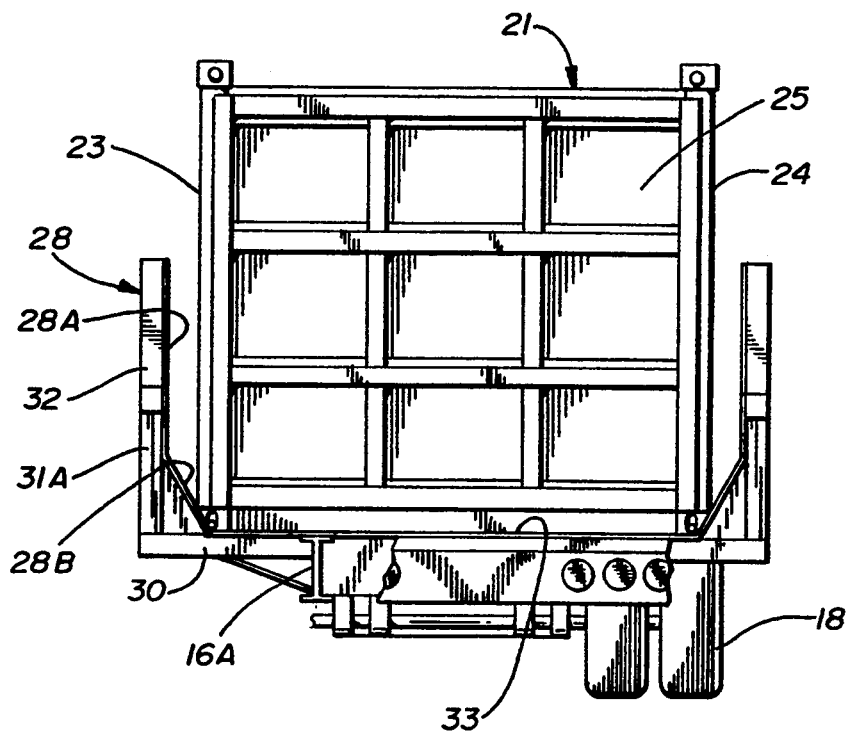
FIG. 3 is an end plan view of the trailer with portions broken away on lines 3—3 of FIG. 1.

Referring to FIGS. 1-3 of the drawings, a dump trailer assembly 10 is shown comprising a tractor 11 and a frameless dump trailer. The tractor 11 has a cab 12, wheel assemblies 13 shown in broken lines and a fifth wheel hitch 15 as is well known and understood by those skilled in the art.

The frameless dump trailer of the invention has a unitized bed frame 16 which in its preferred embodiment is formed of aluminum extruded I beams 16A having contiguous upper and lower cords 16C and 16D and cross members 16B in a unitized rigid structure. A piston and cylinder assembly 17 extends from the distal end of said flat bed unitized frame assembly 16 to the fifth wheel trailer hitch 15 as hereinbefore described. The flat bed unitized frame assembly 16 has multiple support wheel assemblies 18 secured inwardly from the free end of said trailer assembly generally illustrated for reference purposes only. Pairs of oppositely disposed container locks 19 and 20 are positioned in spaced transverse parallel relation to one another on said flat bed unitized frame assembly 16 inwardly of its respective distal and free ends.

An ISO container 21 shown in broken lines has opposing sidewalls 22 and 24, interconnected bottom and front wall 24A. A hinge door assembly 25 extends between said sidewalls defining the generally rectangular ISO container 21 which is well known and understood by those skilled in the art.

The flat bed unitized frame assembly 16 has an ISO container receiving surface 26 defined by said I beams and cross members 16A and B respectively that extends from said piston and cylinder assembly 17, the length of the trailer. A dump guide assembly 27 extends inwardly and outwardly from said free end of said flat bed unitized frame assembly 16 defining a transfer path TP from the ISO container 21 over the unitized flat bed frame assembly 16 to the dump site (not shown).

Figure 4:
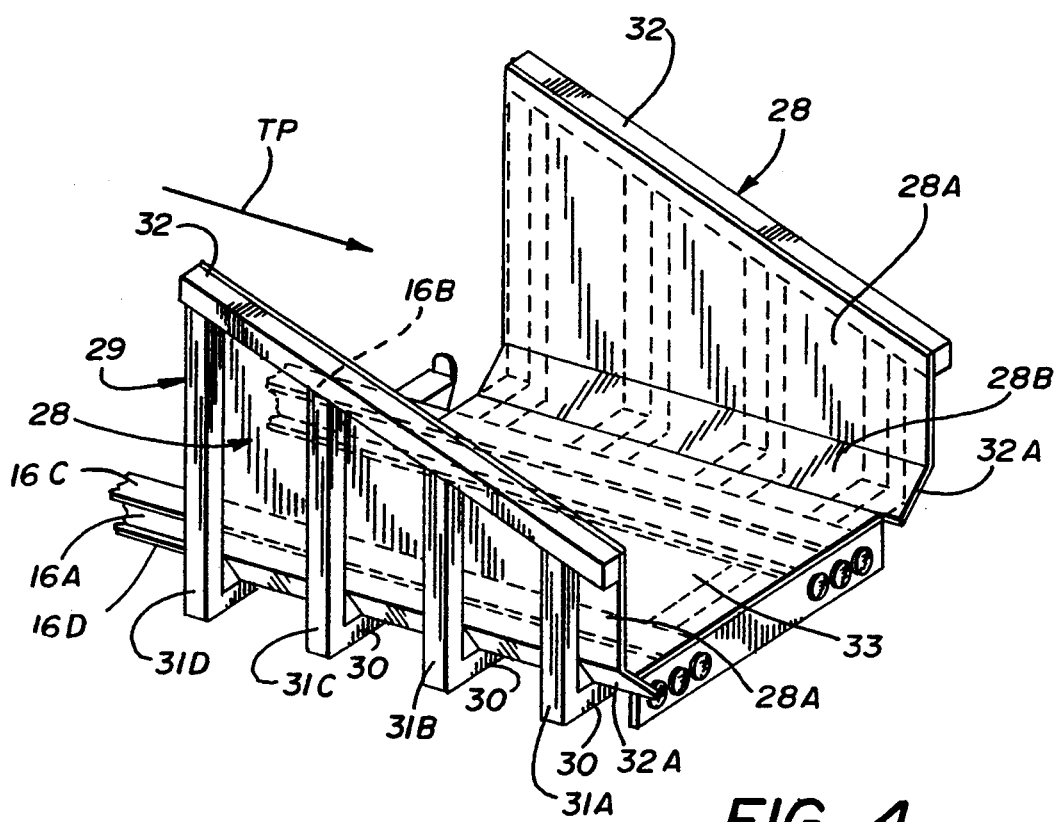
FIG. 4 is an enlarged perspective view of a portion of the trailer in FIG. 1 showing the invention.

The dump guide assembly 27 is comprised of a pair of spaced opposing guide walls 28, each having a support frame 29. The support frame 29 has multiple longitudinally spaced arms 30 extending horizontally from said extruded beams 16A, best seen in FIGS. 3 and 4 of the drawings. Each of said arms 30 has a right angularly extending upstanding respective extensions 31A, 31B, 31C and 31D that abuts an angularly inclined upper wall support rail 32. Each of said upstanding extensions 31A-D are of a different overall length that is progressively longer beginning with said extension 31A inwardly along the trailer towards its distal end as hereinbefore described.

Each of said wall support rails 32 extends beyond said corresponding arms 30 and extensions 31 at 32A, best seen in FIGS. 1 and 3 of the drawings. Each of said guide walls 28 extend from said wall support rail 31 to said container receiving surface 26 defining two independent planar surfaces 28A and B. The guide wall's planar surface 28B is angularly disposed and of a uniform height over its entire length, while the guide wall planar surface 28A is disposed vertically in relation to the container receiving bed surface 26. The extensions 31A-D match the inclination of the upper support rails 32. A guide floor 33 extends between said guide walls over said extruded frame beams and cross members 16A and B.

Referring now to FIG. 2 of the drawings, the dump trailer assembly 10 can be seen with the attached ISO container 21 in elevated i.e. (dumped) position. The flat bed unitized frame assembly 16 and attached ISO container 21 has been raised to an inclined position by the multiple extensible piston and cylinder assembly 17 as hereinbefore described. A draft arm assembly 35 stabilizes the flat bed unitized frame assembly 16 during lifting and is pivotally secured to said trailer bed at 36 as is well understood by those skilled in the art.

The hinged door assembly 25 which when opened allows the contents (not shown) of the container 21 to be dumped within the dump guide assembly 27 that defines the dump path TP has indicated by the arrow in FIG. 3 of the drawings.

The guide walls 28 and guide floor 33 allow for dumping of the ISO container contents (not shown) without having to remove, or move the ISO container 21 from the preferred transport position of even weight distribution between the wheel assemblies 14 and 18 as hereinbefore described.

It will be apparent to those skilled in the art that various changes and modifications may be made therein without departing from the spirit of the invention, Therefore I claim:

1. In combination a dump trailer adapted for attachment to a tractor for transporting removable containers used to move irregular bulk material to a dump site and discharging same without removing said containers from said dump trailer, said containers comprises opposite sidewalls, interconnected bottom, front and end walls, and a hinged door assembly between said sidewalls, said dump trailer comprises an elongated unitized bed frame having distal and free ends, wheel assemblies disposed adjacent said unitized bed frame's free end, a support plate adapted for selective engagement with a fifth wheel on said tractor, draft arms pivotally secured at opposite ends to said support plate and said unitized bed frame, a dump guide for said irregular bulk material within said container positioned on said unitized bed frame adjacent said free end, said dump guide having a pair of oppositely disposed guide walls extending outwardly and upwardly from said unitized bed frame and a guide floor therebetween, said guide walls comprises a plurality of longitudinally spaced arms extending outwardly from said unitized bed frame and upstanding extensions extending at right angles from said arms defining said guide wall, a wall support rail interconnected and secured to respective free ends of said upstanding extensions defining a support frame, means for selectively raising said unitized bed frame pivotally about said wheel assembly, means for securing said container to said dump trailer.

2. The dump trailer of claim 1 wherein said unitized bed frame comprises a pair of spaced parallel beams with interconnecting support elements and said container securing means comprising outboard container lock assemblies.

3. The dump trailer of claim 1 wherein each of said guide walls define a first and second planar surface, said first of said planar surfaces extending from said guide floor.

4. The dump trailer of claim 3 wherein said second of said planar surfaces extend from said first planar surface and wherein said second of said planar surfaces angularly dispose along its free longitudinal edge in relation to said guide floor.

5. The dump trailer of claim 1 wherein said means for securing said containers to said trailer comprises pairs of spaced container locks extending from said flat bed assembly interengaging said removable containers.

6. A dump trailer adapted for attachment to an associated tractor for transporting containers having opposite sidewalls connected by a floor and a front and rear end walls, the trailer comprises an elongated unitized bed frame having distal and free ends, said unitized bed frame comprising spaced parallel contoured extruded aluminum I-beams having contiguous upper and lower cords with an integral web therebetween, wheel assemblies disposed adjacent said unitized bed frame's free end, a support plate adapted for selective engagement with a fifth wheel on said associated tractor, draft arms pivotally secured at opposing ends to said support plate and said unitized bed frame, a dump guide positioned on said unitized bed frame adjacent said free end, said dump guide having a pair of spaced opposing guide walls extending from said utilized bed frame and a guide floor therebetween, a plurality of longitudinally spaced arms extending outwardly from said unitized bed frame, upstanding extensions extending at right angles from said arms defining said guide walls, means to detachably secure the container to the I-beams, and means for selectively raising said unitized bed frame pivotally about said wheel assembly.

7. The dump trailer of claim 6 wherein said means for selectively raising said unitized bed frame pivotally about said wheel assembly comprises a multiple telescopically extensible piston and cylinder assembly engageable from said trailer to said unitized bed frame.

* * * * *